US012511974B2

(12) United States Patent
Dombi et al.

(10) Patent No.: US 12,511,974 B2
(45) Date of Patent: Dec. 30, 2025

(54) METHOD FOR A GAMING SYSTEM

(71) Applicant: Play'n Go Marks Ltd, Valletta (MT)

(72) Inventors: Peter Dombi, Valletta (MT); Michael Collins, Valletta (MT)

(73) Assignee: PLAY'N GO MARKS LTD, Valletta (MT)

( * ) Notice: Subject to any disclaimer, the term of this patent is extended or adjusted under 35 U.S.C. 154(b) by 386 days.

(21) Appl. No.: 18/094,485

(22) Filed: Jan. 9, 2023

(65) Prior Publication Data

US 2023/0222868 A1 Jul. 13, 2023

(30) Foreign Application Priority Data

Jan. 11, 2022 (SE) .................................. 2250015-1

(51) Int. Cl.
*G07F 17/32* (2006.01)

(52) U.S. Cl.
CPC ...... *G07F 17/3223* (2013.01); *G07F 17/3213* (2013.01); *G07F 17/3267* (2013.01); *G07F 17/3218* (2013.01)

(58) Field of Classification Search
CPC ............. G07F 17/3211; G07F 17/3225; G07F 17/326; G07F 17/3213; G07F 17/3223; G07F 17/3267
See application file for complete search history.

(56) References Cited

U.S. PATENT DOCUMENTS

| | | | | | |
|---|---|---|---|---|---|
| 6,319,124 | B1 * | 11/2001 | Baerlocher | G07F 17/34 | 463/31 |
| 6,375,570 | B1 * | 4/2002 | Poole | G07F 17/3227 | 463/31 |
| 8,177,622 | B2 * | 5/2012 | Englman | G07F 17/34 | 463/31 |
| 8,562,416 | B2 * | 10/2013 | Baerlocher | G07F 17/34 | 463/16 |
| 9,092,949 | B2 * | 7/2015 | Aida | G07F 17/3267 | |
| 9,520,031 | B2 * | 12/2016 | Brito | G07F 17/3265 | |
| 9,728,050 | B2 * | 8/2017 | Elias | G07F 17/34 | |
| 11,257,327 | B1 * | 2/2022 | Sanborn | G07F 17/3213 | |
| 2005/0075162 | A1 * | 4/2005 | Duhamel | G07F 17/32 | 463/20 |
| 2008/0146319 | A1 * | 6/2008 | Yoshizawa | G07F 17/3265 | 463/21 |
| 2011/0028202 | A1 * | 2/2011 | Naicker | G07F 17/3244 | 463/20 |
| 2011/0111828 | A1 * | 5/2011 | Caputo | G07F 17/34 | 463/43 |
| 2011/0201406 | A1 * | 8/2011 | Jaffe | G07F 17/34 | 463/21 |

(Continued)

OTHER PUBLICATIONS

Swedish Search Report mailed Sep. 20, 2022 for Swedish Patent Application No. 2250015-1, 3 pages.

*Primary Examiner* — Chase E Leichliter
(74) *Attorney, Agent, or Firm* — RMCK Law Group, PLC

(57) ABSTRACT

The present disclosure relates to a computer implemented method performed by a gaming system. In particular, the present disclosure relates to a scheme for further improving a randomness in a game provided by means of the gaming system. The present disclosure also relates to a corresponding gaming system and a computer program product.

20 Claims, 4 Drawing Sheets

(56) References Cited

U.S. PATENT DOCUMENTS

| | | | | |
|---|---|---|---|---|
| 2013/0109458 | A1* | 5/2013 | Demsetz | G07F 17/3265 463/20 |
| 2013/0217464 | A1* | 8/2013 | Terdina | G07F 17/3288 463/20 |
| 2013/0296018 | A1* | 11/2013 | Aida | G07F 17/34 463/20 |
| 2014/0141860 | A1* | 5/2014 | Meyer | G07F 17/3213 463/20 |
| 2015/0094132 | A1* | 4/2015 | Elias | G07F 17/34 463/20 |
| 2016/0093153 | A1* | 3/2016 | Hawkins | G07F 17/3244 463/20 |
| 2016/0232743 | A1* | 8/2016 | Thomas | G07F 17/3213 |
| 2017/0053496 | A1* | 2/2017 | Borissov | G07F 17/3267 |
| 2017/0316651 | A1* | 11/2017 | Wortmann | G07F 17/3223 |
| 2017/0372558 | A1* | 12/2017 | You | G07F 17/3267 |
| 2018/0033253 | A1* | 2/2018 | Vann | G07F 17/3246 |
| 2018/0061186 | A1* | 3/2018 | Berman | G07F 17/3265 |
| 2018/0102020 | A1* | 4/2018 | You | G07F 17/3267 |
| 2018/0247134 | A1* | 8/2018 | Bulzacki | G06F 18/251 |
| 2018/0286183 | A1* | 10/2018 | Davis | G07F 17/34 |
| 2019/0102992 | A1* | 4/2019 | You | G07F 17/3213 |
| 2020/0005600 | A1* | 1/2020 | Marks | G07F 17/3267 |
| 2020/0111301 | A1* | 4/2020 | Wasinger | G07F 17/3267 |
| 2020/0294361 | A1* | 9/2020 | Peterson | G07F 17/3265 |
| 2021/0012608 | A1* | 1/2021 | Chadwell | G07F 17/3244 |
| 2021/0201629 | A1* | 7/2021 | Hawkins | G07F 17/34 |
| 2021/0366237 | A1* | 11/2021 | Bouvier | G07F 17/34 |
| 2022/0351578 | A1* | 11/2022 | Delekta | G07F 17/3265 |
| 2022/0351579 | A1* | 11/2022 | Davis | G07F 17/3213 |
| 2023/0033113 | A1* | 2/2023 | Penacho | G07F 17/3211 |
| 2023/0154285 | A1* | 5/2023 | Cohn | G07F 17/3244 463/20 |
| 2023/0169820 | A1* | 6/2023 | Warms | G07F 17/34 463/31 |
| 2023/0222868 | A1* | 7/2023 | Dombi | G07F 17/326 463/20 |
| 2023/0290214 | A1* | 9/2023 | Blinman | G07F 17/3225 |

* cited by examiner

METHOD FOR A GAMING SYSTEM

CROSS-REFERENCE TO RELATED APPLICATIONS

This application claims priority to Swedish Patent Application No. 2250015-1, filed on Jan. 11, 2022. The disclosure of the above application is hereby incorporated by reference in its entirety.

TECHNICAL FIELD

The present disclosure relates to a computer implemented method performed by a gaming system. In particular, the present disclosure relates to a scheme for further improving a randomness in a game provided by means of the gaming system. The present disclosure also relates to a corresponding gaming system and to a computer program product.

BACKGROUND

Games of chance are known and widely played for recreational purposes. The gaming industry has come to recognize that to sustain long term success it must be constantly innovative in introducing new games and new gaming concepts to the gaming public. One example of this innovating drive can be appreciated in the embrace of the Internet and online gaming by the gaming industry.

A common trend within the online gaming industry is to provide potentially new and current players with new means for attracting and ensuring that players remain at the online site, controlled by a gaming operator, providing the games. An example of such a means is the introduction of further unexpected scenarios in the game, potentially allowing a player to be further driven to play the game since the player has a desire to participate with the game in case of such an unexpected scenario appearing.

The introduction of possible unexpected scenarios in the game could also further increase the payout to the player, since the unexpected scenario possibly could add a further leverage to a bet placed by the player. Although this of course is of high interest to the player, such further possible payouts must be closely controlled by a gaming operator, ensuring that the payouts stay within desired boundaries. Thus, there is a general need to balance the attraction power of the game by means of possible further and higher payouts, while at the same time ensuring that an operator is in total control of the game.

SUMMARY

According to an aspect of the present disclosure, the above is at least partly met by a computer implemented method performed by a gaming system adapted to execute a gaming procedure comprising a series of consecutive games, the gaming system comprising a server arranged in communication with an electronic user device using a network connection, the electronic user device comprising a display screen, wherein the method comprises the steps of forming, at the server, a table having a predetermined dimension and comprising a corresponding number of cells, generating, at the server, a first set of elements corresponding to the cells of the table, each generated element being one of a plurality of predefined element types, populating, at the server, the cells of the table with the first set of elements, controlling, using the server, the electronic user device to display the table at the display screen, matching, at the server, a cluster of adjacently arranged cells at a position within the table with one of a plurality of predefined cluster formations stored at the server, and initiating, at the server, an award procedure as a result of a successful cluster matching, wherein within the award procedure the cluster of adjacently arranged cells remain at the position within the table for a predetermined portion of the series of consecutive games.

Generally, when the operational scheme according to the present disclosure is applied to a game concept provided by the server, it may be possible to increase the randomization of the game, thus potentially allowing for increasing winning possibilities for a player participating in the game. An advantage following such a possibility is an improved attraction power to the game, thus potentially allowing for the player to remain playing the game for an increased duration as compared to previously known similar operational schemes. This could potentially be beneficial to both the player participating in the game and the gaming operator providing the game.

Additionally, allowing for an increased randomization of the game may potentially further increase the security of the game, since known general computer-based issues relating to the generation of randomized material to the game are minimized.

These advantageous effects are achieved by allowing a portion of the first set of cells within the table to remain "in position" for at least some of the subsequent games in the series of games that are provided to a player operating a user device. Accordingly, in the subsequent games in the series of games the cells not occupied by the cluster of adjacently arranged cells will be populated with a "new" second set of elements. This nonlinear repopulation of the cells of the table will thus greatly increase randomness as well as appearing appealing for the player operating the user device.

In some embodiments, the cluster includes at least three matching elements together matching one of the plurality of predefined cluster formations, preferably four matching elements together matching one of the plurality of predefined cluster formations and more preferably five matching elements together matching one of the plurality of predefined cluster formations.

The expression "matching" should however be interpreted broadly, including any elements that have been predefined as matching. Accordingly, matching elements must not necessarily be the same type of elements but could for example be related element types. As an example, if the server identifies that the elements of the tables are arranged in such a manner that a predetermined number of adjacent cells comprise matching elements, then this identified "cluster of elements" are matched with a plurality of predefined cluster formations. The types or elements may for example include numbers and/or symbols of any kind and matching a desired implementation of the game to be played by the player.

The detection of the cluster of elements may in some embodiments be based on the concept of computational geometry. As such, the plurality of elements are arranged in a table, where the server is arranged to read the content of the table row by row to detect the cluster of elements, by structuring the elements according to predefined rules. As an example, if a cell holding an element that touches (adjacently arranged to) another cell with a matching element, either in vertical or horizontal directions, then this cell is associated with the cluster.

Furthermore, the definition of "adjacently" may be dependent on the specific implementation of the present scheme. For example, adjacently may be defined as arranged on the same row of the table or in the same column of the table. It may however also be possible to allow other cluster formations to be seen as adjacently, such for example comprising a combination of cells arranged both on different columns and on different rows, but at least sharing a side of a cell to another cell holding a matching element. Other definitions of clusters comprising matching elements are of course possible and within the scope of the present disclosure. Such a further example of a cluster may be where matching elements form specific "shapes", but not necessarily share a cell side with each other. Thus, two adjacent cells may possibly, in some embodiments, be seen as two cells at least having "touching" cell corners.

For ensuring that the matching is performed with a minimum amount of perceived delay in the progression of the game it is desirable to apply a computational efficient predefined matching scheme. Possible schemes that can be used in relation to the present disclosure include different forms of feature detection algorithms that today find usage within e.g. the computer vision field, such as for detecting and describing local features in images. In some embodiments of the present disclosure the predefined matching scheme may be selected to apply e.g. feature descriptors or feature vectors, where the plurality of predefined cluster formations are expressions of such feature descriptors or feature vectors. Other predefined matching schemes are also possible and within the scope of the present disclosure.

In some embodiments, the plurality of predefined cluster formations generates different gaming outcomes, where potentially in comparison more "complex" clusters comprising specifically "unusual" elements may generate a different gaming outcome as compared to a less complex cluster comprising "common" elements.

Furthermore, in accordance to the present disclosure, when the award procedure is triggered, elements are generated, by the server, in each cell independently of other cells. Accordingly, the award procedure will take place within a specific game, whereby the award procedure will allow repopulation with new elements (except for the adjacently arranged cells that are defined to remain in position) when still within a specific game of the series of consecutive games. As a result, the player will be given a further chance to achieve a positive gaming outcome and a thereto related possible payout.

In a possible embodiment of the present disclosure, the new elements are formed in an automatic manner, meaning that the player must not necessarily interact with the server for the automatic formation of the new set of elements.

In some embodiments, the player may be given a plurality of chances to achieve such a positive gaming outcome, namely by allowing the award procedure to include more than a single repopulation with new elements (and subsequent determination of gaming outcome). Possibly, in some embodiments at least three repopulations with new elements are performed. However, it may of course be possible to repopulate e.g. one time, two times, four times, etc.

The number of time that the award procedure is allowed to proceed (continue) for may in a possible embodiment be dependent on if one or a plurality of further elements are "added" to the cluster of adjacently arranged matching cells, e.g. where cells of the table surrounding the cluster of adjacently arranged matching cells randomly are repopulated with new elements that matches the cells comprised in the cluster of adjacently arranged matching cells. Accordingly, if the cluster of adjacently arranged matching cells as such "increases", it may be possible to allow the award procedure to continue for a predetermined time.

Preferably, the at least one cluster is removed at the end of the predetermined portion of the series of consecutive games comprised with the award procedure. As such, the game will proceed back to a "normal" operation, whereby the next of the series of consecutive games will be executed. It is of course advantageous to allow the award procedure to again be initiated in a situation where a new cluster of cells are identified by the server. Possibly, the award procedure may be time limited, meaning that the award procedure is only allowed to be initiated once every predefined time frame, such as e.g. once every 10 minutes, 20 minutes, etc.

In a possible embodiment, it may be possible to allow the procedure according to the present disclosure to additionally comprising the step of initiating a further award procedure in response to the table being comprised of only clusters. In such an embodiment it may be possible to allow the further award procedure to include selecting an award modifier. The award modifier may in turn be a multiplication factor.

In some embodiments it may be possible to allow the award procedure to be arranged in such a manner that the repopulation with new elements is achieved by implementing a "spinning reel" within each of the cells that are to be repopulated with new elements. Accordingly, in such an embodiment the server will control the user device to display such a spinning reel. In some embodiments the server will transmit graphical data that is displayed at a graphical user interface (GUI) of the user device for achieving the spinning reel. However, to reduce the amount of data that is transmitted between the server and the user device it may as an alternative be possible to form control data (e.g. meta data) at the server that subsequently is transmitted to and used by the control unit for creating the graphical data to be displayed within the GUI at the user device. In some embodiments a bandwidth constrain in the network communication between the server and the user device controls if the server should transmit the graphical data of the control data. This embodiment also ensures that the game is progressing as effectively as possible and with a reduced computational load placed on the server, the network and the user device.

The server may in a corresponding manner be adapted to form a graphical representation of at least one of the table, the gaming outcome and the updated table, to be distributed to the electronic user device, where the graphical representation is then presented within the GUI. Similarly, the server may instead select to form control data to be used by the user device, where the user device instead will generate the graphical data to be displayed within the GUI at the user device.

Such a GUI may also be arranged to allow the player to directly interact with the server, for example allowing the player to control his/her participation in the game as well as to control a size of the bet placed when participating in the game.

Additionally, it may also be possible to allow the graphical representation to be set differently for different game operators, players or groups of players. The graphical representation may also be dependent on e.g. the geographical location of the players, such as dependent on city, country or continent where the player is located/registered.

Within the context of the present disclosure, it should be understood that it in some embodiments so that it may be possible to allow the server to control if a specific electronic user device is to be allowed to apply the scheme according to the present disclosure. Such control may for example be dependent on a geographical location of the electronic user device. Possibly, the geographical location may be selected from a group comprising a city, a country and a continent.

In some embodiments of the present disclosure the first game is a game of chance, such as for example a slot game, where the player is placing a bet to be allowed to participate in the game. The gaming outcome may in such an embodiment be dependent on the bet placed by the player.

According to another aspect of the present disclosure there is provided a gaming system adapted to execute a gaming procedure comprising a series of consecutive games, the gaming system comprising a server arranged in communication with an electronic user device using a network connection, the electronic user device comprising a display screen, wherein the server is adapted to form a table having a predetermined dimension and comprising a corresponding number of cells, generate a first set of elements corresponding to the cells of the table, each generated element being one of a plurality of predefined element types, populate the cells of the table with the first set of elements, control the electronic user device to display the table at the display screen, match a cluster of adjacently arranged cells at a position within the table with one of a plurality of predefined cluster formations stored at the server, and initiate an award procedure as a result of a successful cluster matching, wherein within the award procedure the cluster of adjacently arranged cells remain at the position within the table for a predetermined portion of the series of consecutive games. This aspect of the present disclosure provides similar advantages and embodiments as discussed above in relation to the previous aspects of the present disclosure.

Preferably, the gaming system is a cloud-based computing system and the server is a cloud server. Thus, the computing power provided by means of the invention may be distributed between a plurality of servers, and the location of the servers must not be explicitly defined. Advantageous following the use of a cloud-based solution is also the inherent redundancy achieved.

In some embodiments the electronic user devices may be selected to include e.g. a computer (laptop/stationary), a mobile phone, a tablet, a (gaming) consoles or any other gaming device and gambling terminals. The GUI may in some embodiments be allowed to depend on the type of electronic user device.

According to a still further aspect of the present disclosure there is provided a computer program product comprising a computer readable medium having stored thereon computer program means for operating a gaming system, the gaming system comprising a server arranged in communication with an electronic user device using a network connection, the electronic user device comprising a display screen, wherein the computer program product comprises code for forming, at the server, a table having a predetermined dimension and comprising a corresponding number of cells, code for generating, at the server, a first set of elements corresponding to the cells of the table, each generated element being one of a plurality of predefined element types, code for populating, at the server, the cells of the table with the first set of elements, code for controlling, using the server, the electronic user device to display the table at the display screen, code for matching, at the server, a cluster of adjacently arranged cells at a position within the table with one of a plurality of predefined cluster formations stored at the server, and code for initiating, at the server, an award procedure as a result of a successful cluster matching, wherein within the award procedure the cluster of adjacently arranged cells remain at the position within the table for a predetermined portion of the series of consecutive games. Also this aspect of the present disclosure provides similar advantages and embodiments as discussed above in relation to the previous aspects of the present disclosure.

The computer program product is typically executed using a computing device comprised with the server, preferably including a microprocessor or any other type of computing device. Similarly, a software executed by the server for operating the gaming system may be stored on a computer readable medium, being any type of memory device, including one of a removable nonvolatile random access memory, a hard disk drive, a floppy disk, a CD-ROM, a DVD-ROM, a USB memory, an SD memory card, or a similar computer readable medium known in the art. Accordingly, operation of the gaming system may be at least partly automated, implemented as e.g. software, hardware and a combination thereof.

Further features of, and advantages with, the present disclosure will become apparent when studying the appended claims and the following description. The skilled addressee realize that different features of the present disclosure may be combined to create embodiments other than those described in the following, without departing from the scope of the present disclosure.

BRIEF DESCRIPTION OF THE DRAWINGS

The various aspects of the present disclosure, including its particular features and advantages, will be readily understood from the following detailed description and the accompanying drawings, in which.

DETAILED DESCRIPTION

Figure 1:
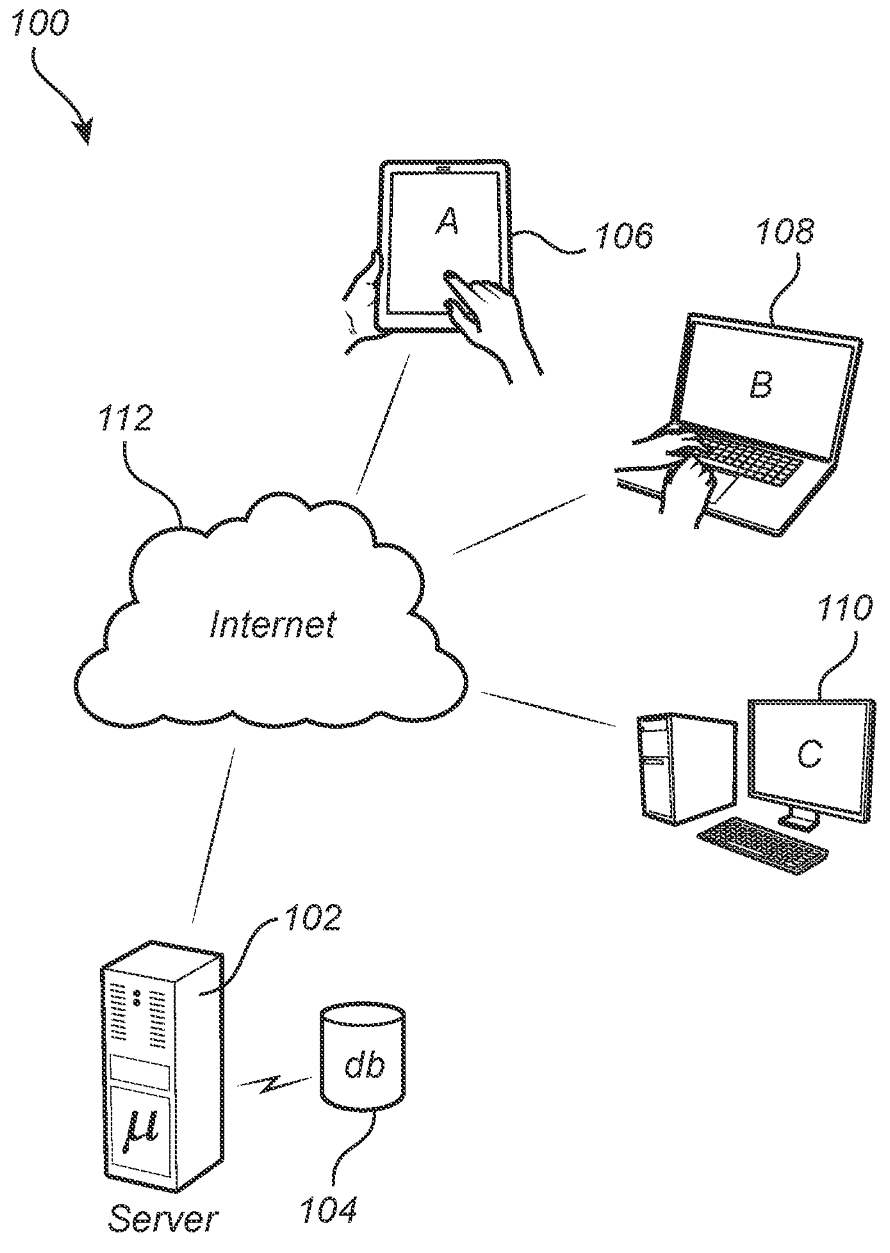
FIG. 1 illustrates an exemplary gaming system according to a currently preferred embodiment of the present disclosure.

The present disclosure will now be described more fully hereinafter with reference to the accompanying drawings, in which currently preferred embodiments of the present disclosure are shown. This present disclosure may, however, be embodied in many different forms and should not be construed as limited to the embodiments set forth herein; rather, these embodiments are provided for thoroughness and completeness to fully convey the scope of the present disclosure to the skilled addressee. Like reference characters refer to like elements throughout.

Referring now to the drawings and FIG. 1 in particular, there is depicted a gaming system 100 in which an online game, such as a slot game, may be played according to a currently preferred embodiment of the present disclosure. The system architecture illustrated in FIG. 1 depicts a system environment in which systems, methods, apparatus, computer-readable mediums and data structures consistent with the principles of some embodiments of the present disclosure may be included. It may be appreciated that the components of system 100 may be implemented through any suitable combinations of hardware, software, and/or firmware.

As shown in FIG. 1, system 100 includes at least one server 102 and/or at least one gaming database 104. Server 102 and gaming database 104 may be communicably linked to a plurality of electronic user devices in the form of electronic user devices, such as client devices 106, 108, 110, etc. through network 112. The network 112 may be wired or wireless, including for example wired connections like a building LAN, a WAN, an Ethernet network, an IP network, etc., and wireless connections like WLAN, CDMA, GSM, GPRS, 3G mobile communications, 4G mobile communications, Bluetooth, infrared, or similar. As such, the network 112 may be locally and/or globally provided.

The gaming database 104 may be any type of physical unit on which games reside, such as a machine in a gaming venue, a lottery machine, an electronic game system, etc. Network 112 may be implemented as the Internet, or any local or wide area network, either public or private. Network 112 may also be a hardware system physically connecting some or all of the server 102 and client devices 106, 108, 110. Client devices 106, 108, 110, typically each operated by a player, may be implemented as any computing devices such as a personal computing device, a server, a server network, handheld computing device, slot machine, other gaming machine in a gaming venue such as a betting terminal, a gaming console, lottery machine, an interface in a virtual environment, etc.

It may be appreciated by one of ordinary skill in the art that while only one server, one gaming database, one network and two client devices are depicted, more or fewer servers, more or fewer gaming databases, more networks and more or fewer client devices and/or other devices may reside within system 100.

The elements inside system 100 may include one or more (micro) processors, purpose-built hardware such as, for example, FPGA, ASIC, etc., software systems and applications, software packages, mechanical and electrical parts, etc. Software packages that may be part of server 102, gaming database 104, client devices 106, 108, 110 and network 112 may be recorded on a computer readable medium such as a memory device, RAM, CD/DVD/USB drives, handheld memory device, etc., and/or may be part of a physical device such as one or more (microprocessors or electro-mechanical systems. Any of server 102, gaming database 104, client devices 106, 108, 110, network 112 and further electronic user device 114 may be fixed systems, mobile systems, portable systems, or cloud systems (as discussed above). FIG. 1 shows only three electronic user devices 106, 108, 110, however it should be understood that a general implementation of the present disclosure comprises a large plurality of electronic user devices, possibly greatly above three, such as 100, 1000, 10000, etc.

Although the various components of FIG. 1 are illustrated as discrete elements, it should be recognized that certain operations of some of the various components may be performed by the same physical device, e.g., by one or more microprocessors or other type of devices.

Figure 2:
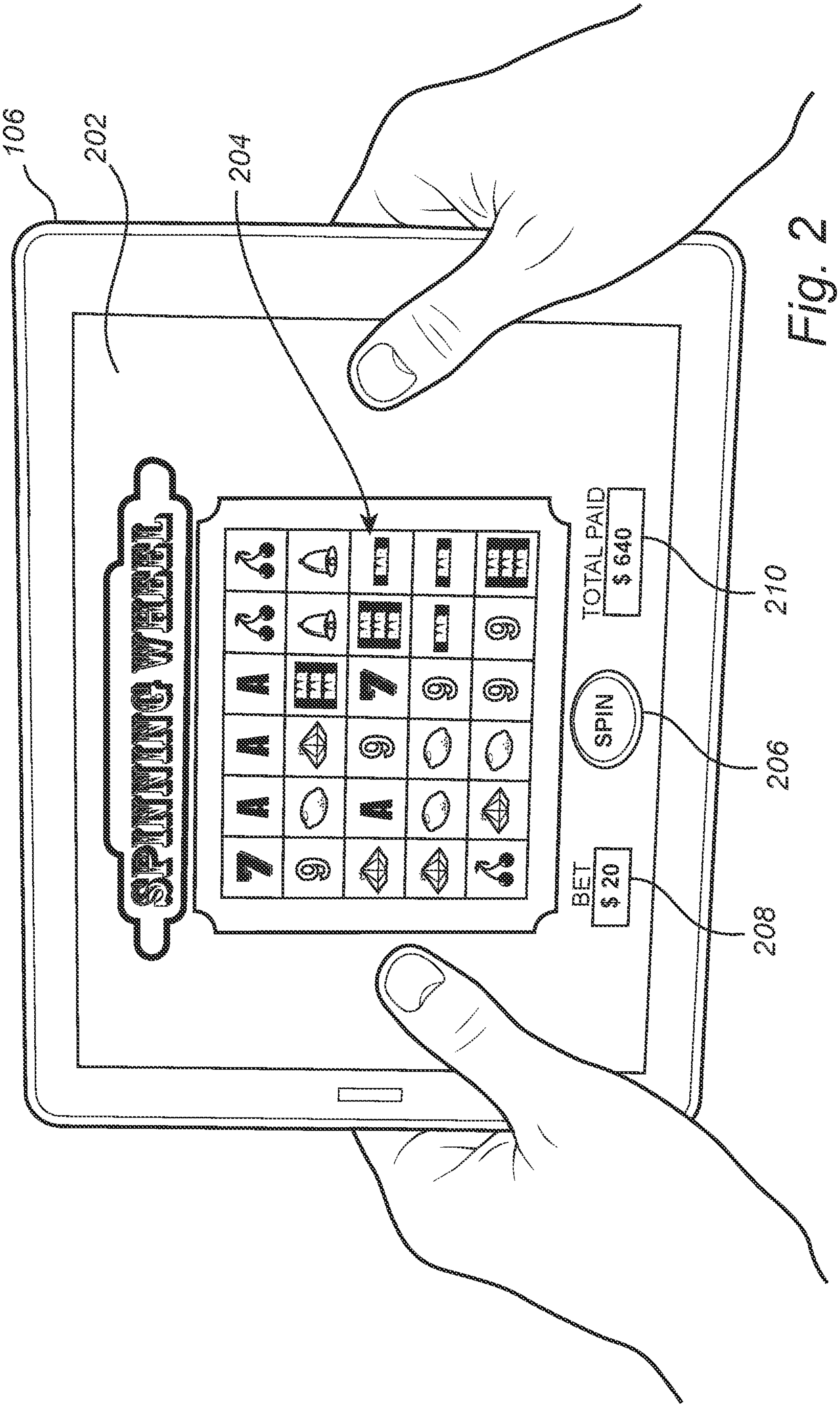
FIG. 2 provides an exemplary illustration of a typical graphical user interface (GUI) for use in playing a game.

Turning now to FIG. 2 illustrating a graphical user interface (GUI) 202 to be displayed at a client device, such as any of the client devices 106, 108, 110, in the illustrated embodiment provided as an application ("app") or within e.g. a web browser of the portable client device 106 being a tablet. The game to be played at the client device 106 is here shown as an online game of chance in the form of a slot game, visualized within the GUI 202 as comprising a table comprising six individual reels 204 arranged in columns and provided with a plurality of different symbols. The table also comprises five rows. As such, the predefined dimension of the table as shown in FIG. 2 is six times five, thus comprising 30 cells in total.

The GUI also comprises a "button" 206 to start the game, here provided with the description "SPIN" for initiating a turn of the game. In addition, the GUI 202 comprises an indicator of the current bet 208 (i.e. payment for each turn of the game) and an indicator of the total payment to the player 210. It should in any case be understood that other types of games may be played within the scope of the present disclosure, for example being skill based as compared to a game of chance.

Figure 3A:
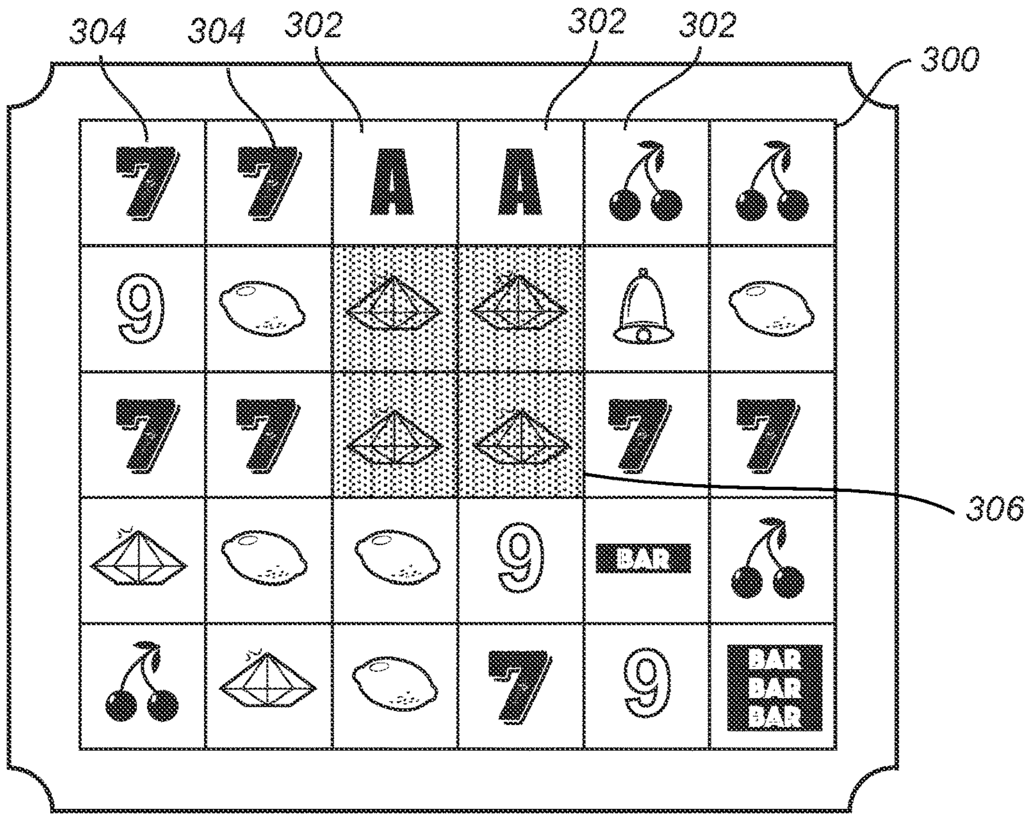
FIGS. 3A-3B present exemplary illustrations of operations of different tables according to different embodiments of the present disclosure.
Figure 3B:
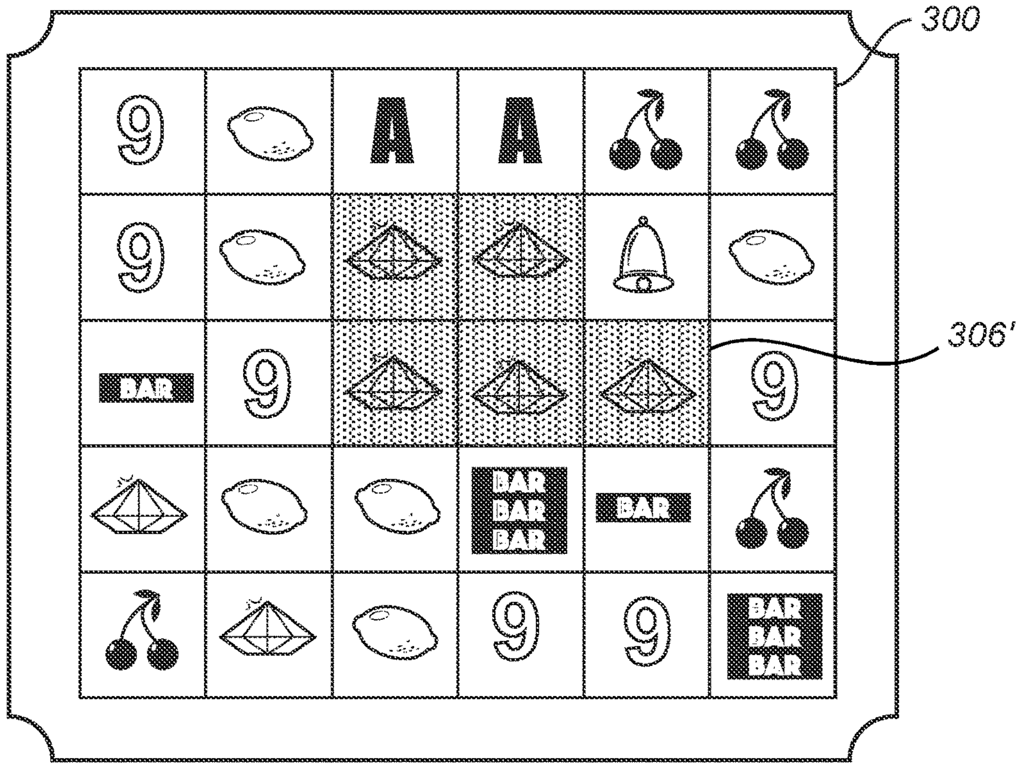
Figure 4:
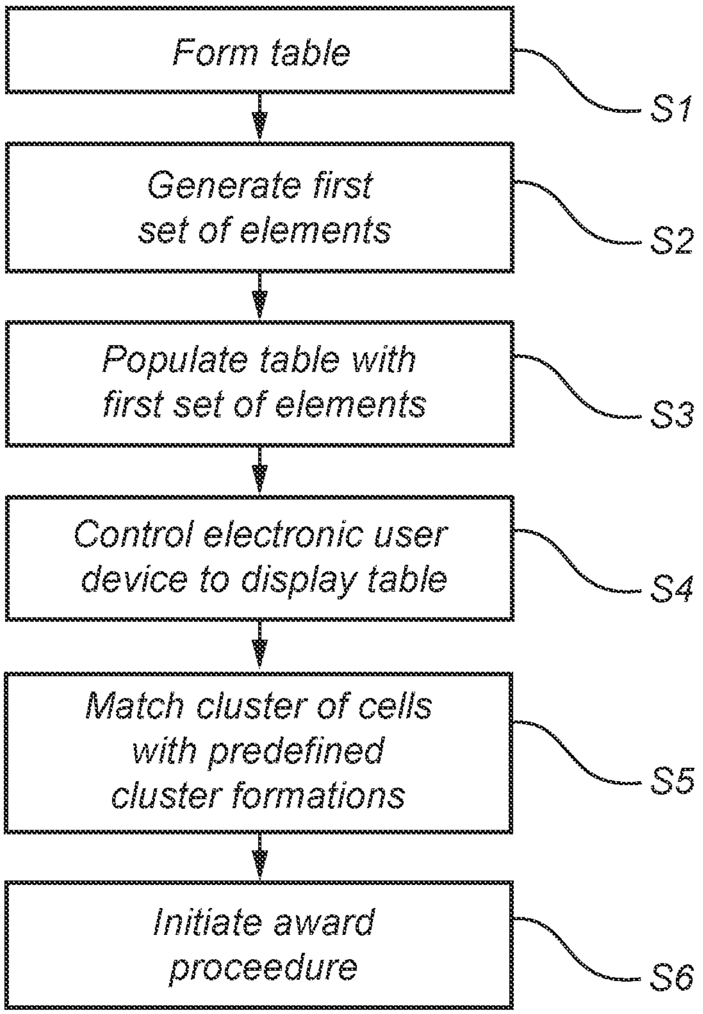
FIG. 4 is a flow chart illustrating the exemplary steps for operating the gaming system as shown in FIG. 1.

Turning now to FIGS. 3A and 3B in conjunction with FIG. 4, illustrating different tables according to different embodiments of the present disclosure.

As is exemplified in FIG. 3A, the server has formed, S1, an initial table 300 having a predetermined dimension and comprising a corresponding number of cells 302. The table 300 dimensionally corresponds to the table as exemplified in FIG. 2. It may of course be possible to include less or more rows and/or cells within the table. The server has further randomly (or semi-randomly) generated, S2, a first set of elements 304 that are arranged to populate, S3, the cells 302 of the table. Also the positioning of each of the elements 304 within the table 300 may at least be semi-randomly selected. In FIG. 3A, the first set of elements 304 includes different element types, e.g. including numbers and pictograms/figures. It should be noted that any form of element types is possible and within the scope of the present disclosure, at least in case the game is a game of chance.

Once the cells 302 of the table 300 has been populated with the first set of elements 304, the server 102 controls, S4, the electronic user device 106 (or 108, 110) to display the table 300 at a display screen comprised with the electronic user device 106.

When the element populated table 300 is in place, the server 102 performs an automated process of matching, S5, a cluster 306 of matching elements within the table 300. In FIG. 3A, the matching elements are shown as being the pictogram "diamond". Different elements are also shown in FIG. 3A, corresponding to the "normal" type of elements shown in relation to a slot game.

As discussed above, the definition of a cluster may be different depending on the implementation of the present scheme. In FIG. 3A, a cluster is however "matched" only in case at least a predefined number of elements are arranged adjacently to each other. In the embodiment as shown in FIG. 3A, this predefined number has been set to four. This predefined number may of course be set higher and/or lower.

As discussed above, once the server 102 has identified a cluster 306, the server may initiate, S6, an award procedure. The award procedure may for example include a predefined number of "free games" meaning that the player (operator of the user device 106) may be allowed to execute games without having to provide a payment. At this time the server may also determine a gaming outcome that depends on the type of cluster formed (i.e. as compared to predefined cluster formations possibly stored at the database 104).

In line with the present disclosure the cluster 306 will however remain at the position within the table 300 for a predetermined portion of the series of consecutive games being played and being within the award procedure. This can be compared to a "regular" gaming procedure where all the cells of the table 300 are repopulated with a new set of elements.

As such, the player's chance of "winning" an in comparison greater win (in comparison larger gaming outcome) may increase, since the further cells 304 in conjunction with and excluding the cluster 306 subsequently may be repopulated with matching elements, where such matching elements are arranged directly adjacent to the remaining cluster of cells.

In some embodiments the predefined number of free games is in the range of one-five, meaning that the player will be given one-five times of repopulation of the cells 304 in conjunction with and excluding the cluster 306 with new sets of elements.

An example of repopulation of the cells 304 in conjunction with and excluding the cluster 306 is presented in FIG. 3B, once the scheme according to the present disclosure is within the award procedure. One of these new elements is, as shown in FIG. 3B, an additional diamond arranged adjacently to the original cluster 306. The original cluster 306 in combination with the additional diamond here forms an extended cluster 306' comprising five matching elements 304.

The fact that the additional diamond was added to the original cluster 306 to form the extended cluster 306' may in some embodiments be used for adjusting the predefined number of free games. For example, the predefined number of free games may set to a fixed number, added or multiplied with any remaining free games, or be determined in any other way as is defined by the operator of the gaming system 100. In some embodiments the formation of an extended cluster may initiate a second award procedure, for example providing the player with a multiplication factor that is used when determining a gaming outcome. As such, the multiplication factor could for example multiply a payout resulting from the determined gaming outcome.

The repopulation of the cells 304 in conjunction with and excluding the cluster 306 may in some embodiments be performed by implementing a spinning reel function within these cells. Other ways of semi-randomly repopulating these cells are of course possible and within the scope of the present disclosure.

As understood from the above, by implementing the scheme according to the present disclosure it may be possible for the player to have the chance of an extended number of possible (for the player) positive gaming outcomes.

In summary, the present disclosure relates to a computer implemented method performed by a gaming system adapted to execute a gaming procedure comprising a series of consecutive games, the gaming system comprising a server arranged in communication with an electronic user device using a network connection, the electronic user device comprising a display screen, wherein the method comprises the steps of forming, at the server, a table having a predetermined dimension and comprising a corresponding number of cells, generating, at the server, a first set of elements corresponding to the cells of the table, each generated element being one of a plurality of predefined element types, populating, at the server, the cells of the table with the first set of elements, controlling, using the server, the electronic user device to display the table at the display screen, matching, at the server, a cluster of adjacently arranged cells at a position within the table with one of a plurality of predefined cluster formations stored at the server, and initiating, at the server, an award procedure as a result of a successful cluster matching, wherein within the award procedure the cluster of adjacently arranged cells remain at the position within the table for a predetermined portion of the series of consecutive games.

Generally, when the operational scheme according to the present disclosure is applied to a game concept provided by the server, it may be possible to increase the randomization of the game, thus potentially allowing for increasing winning possibilities for a player participating in the game. An advantage following such a possibility is an improved attraction power to the game, thus potentially allowing for the player to remain playing the game for an increased duration as compared to previously known similar operational schemes. This could potentially be beneficial to both the player participating in the game and the gaming operator providing the game.

Generally, when the operational scheme according to the present disclosure is applied to a game provided by the server, it may be possible to increase the randomization of the game, thus potentially allowing for increasing winning possibilities for a player participating in the game. An advantage following such a possibility is an improved attraction power to the game, thus potentially allowing for the player to remain playing the game for an increased duration as compared to previously known similar operational schemes.

In addition, the control functionality of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general-purpose computer, special purpose computer, or special purpose processing machines to perform a certain function or group of functions.

Although the figures may show a sequence the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps. Additionally, even though the present disclosure has been described with reference to specific exemplifying embodiments thereof, many different alterations, modifications and the like will become apparent for those skilled in the art. Further, a single unit may perform the functions of several means recited in the claims. In the claims, any reference signs placed between parentheses shall not be construed as limiting to the claim. Furthermore, in the claims, the word "comprising" does not exclude other elements or steps, and the indefinite article "a" or "an" does not exclude a plurality.

Variations to the disclosed embodiments can be understood and effected by the skilled addressee in practicing the claimed present disclosure, from a study of the drawings, the disclosure, and the appended claims. The person skilled in the art realizes that the present disclosure is not limited to the preferred embodiments.

What is claimed is:

1. A computer implemented method performed by a gaming system adapted to execute a gaming procedure comprising a series of consecutive games, the gaming system comprising a server arranged in communication with an electronic user device using a network connection, the electronic user device comprising a display screen, wherein the method comprises the steps of:

- forming, at the server, a table having a predetermined dimension and comprising a corresponding number of cells,
- generating, at the server, a first set of elements corresponding to the cells of the table, each generated element being one of a plurality of predefined element types,
- populating, at the server, the cells of the table with the first set of elements,
- controlling, using the server, the electronic user device to display the table at the display screen, wherein the controlling of the electronic user device to display the table comprises:
  - generating, by the server, non-graphical control data, and
  - transmitting, by the server and to the electronic user device, the control data such that the electronic user device (i) generates graphical data representative of the populated table based on the control data, and (ii) displays the graphical data at the display screen,
- matching, at the server, a cluster of adjacently arranged cells at a position within the table with one of a plurality of predefined cluster formations stored at the server, and
- initiating, at the server, an award procedure as a result of a successful cluster matching, the successful cluster matching corresponding to a winning cluster of elements,
- wherein within the award procedure:
  - the winning cluster of elements (i) remains at the position within the table for a predetermined portion of the series of consecutive games, and (ii) is adapted to grow in size during the predetermined portion of the series of consecutive games by addition of one or more further elements matching the winning cluster, and
- wherein a number of games within the predetermined portion of the series of consecutive games is dependent on an amount of the one or more further elements added to the winning cluster.

2. The method according to claim 1, wherein the cluster includes at least three matching elements together matching one of the plurality of predefined cluster formations, preferably four matching elements together matching one of the plurality of predefined cluster formations and more preferably five matching elements together matching one of the plurality of predefined cluster formations.

3. The method according to claim 1, wherein when the award procedure is triggered, elements are generated, by the server, in each cell independently of other cells.

4. The method according to claim 3, wherein when the award procedure is triggered, each independent cell of the table includes a reel which spins to generate an element in a cell of the table.

5. The method according to claim 1, wherein the award procedure includes a series of free games.

6. The method according to claim 5, wherein the series of free games includes at least three free games.

7. The method according to claim 5, further comprising the step of extending, at the server, the series of free games if at least one further element is added to the cluster of cells together matching one of the plurality of predefined cluster formations, if additional clusters are generated by the server on the table, if a row of the table is completed by elements forming one or more clusters or a combination thereof.

8. The method according to claim 1, further comprising the step of initiating a further award procedure in response to the table being comprised of only clusters.

9. The method according to claim 8, wherein the further award procedure includes selecting an award modifier.

10. The method according to claim 9, wherein the award modifier is a multiplication factor.

11. The method according to claim 1, wherein the at least one cluster is removed at the end of the predetermined portion of the series of consecutive games comprised with the award procedure.

12. The method according to claim 1, wherein the series of consecutive games are games of chance.

13. A gaming system adapted to execute a gaming procedure comprising a series of consecutive games, the gaming system comprising a server arranged in communication with an electronic user device using a network connection, the electronic user device comprising a display screen, wherein the server is adapted to:

- form a table having a predetermined dimension and comprising a corresponding number of cells,
- generate a first set of elements corresponding to the cells of the table, each generated element being one of a plurality of predefined element types, populate the cells of the table with the first set of elements,
- control the electronic user device to display the table at the display screen, wherein the controlling of the electronic user device to display the table comprises:
  - generating non-graphical control data, and
  - transmitting, by the server and to the electronic user device, the control data such that the electronic user device (i) generates graphical data representative of the populated table based on the control data, and (ii) displays the graphical data at the display screen,
- match a cluster of adjacently arranged cells at a position within the table with one of a plurality of predefined cluster formations stored at the server, and
- initiate an award procedure as a result of a successful cluster matching, the successful cluster matching corresponding to a winning cluster of elements,
- wherein within the award procedure:
  - the winning cluster of elements (i) remains at the position within the table for a predetermined portion of the series of consecutive games, and (ii) is adapted to grow in size during the predetermined portion of the series of consecutive games by addition of one or more further elements matching the winning cluster, and
- wherein a number of games within the predetermined portion of the series of consecutive games is dependent on an amount of the one or more further elements added to the winning cluster.

14. The gaming system according to claim 13, wherein the cluster includes at least three matching elements together matching one of the plurality of predefined cluster formations, preferably four matching elements together matching one of the plurality of predefined cluster formations and more preferably five matching elements together matching one of the plurality of predefined cluster formations.

15. The gaming system according to claim 13, wherein when the award procedure is triggered, elements are generated, by the server, in each cells independently of other cells.

16. The gaming system according to claim 15, wherein when the award procedure is triggered, each independent cell of the table includes a reel which spins to generate an element in a cell of the table.

17. The gaming system of claim 13, wherein the award procedure includes a series of free games.

18. The gaming system according to claim 17, wherein the series of free games includes at least three free games.

19. The gaming system according to claim 17, wherein the server is further adapted to extend the series of free games if at least one further element is added to the cluster of cells together matching one of the plurality of predefined cluster formations, if additional clusters are generated by the server on the table, if a row of the table is completed by elements forming one or more clusters or a combination thereof.

20. A computer program product comprising a non-transitory computer readable medium having stored thereon computer program means for operating a gaming system, the gaming system comprising a server arranged in communication with an electronic user device using a network connection, the electronic user device comprising a display screen, wherein the computer program product comprises:

code for forming, at the server, a table having a predetermined dimension and comprising a corresponding number of cells, code for generating, at the server, a first set of elements corresponding to the cells of the table, each generated element being one of a plurality of predefined element types, code for populating, at the server, the cells of the table with the first set of elements, code for controlling, using the server, the electronic user device to display the table at the display screen, wherein the controlling of the electronic user device to display the table comprises:

generating non-graphical control data, and transmitting, by the server and to the electronic user device, the control data such that the electronic user device (i) generates graphical data representative of the populated table based on the control data, and (ii) displays the graphical data at the display screen, code for matching, at the server, a cluster of adjacently arranged cells at a position within the table with one of a plurality of predefined cluster formations stored at the server, and code for initiating, at the server, an award procedure as a result of a successful cluster matching, wherein within the award procedure:

the winning cluster of elements (i) remains at the position within the table for a predetermined portion of the series of consecutive games, and (ii) is adapted to grow in size during the predetermined portion of the series of consecutive games by addition of one or more further elements matching the winning cluster, and wherein a number of games within the predetermined portion of the series of consecutive games is dependent on an amount of the one or more further elements added to the winning cluster.

* * * * *